United States Patent Office 2,785,178
Patented Mar. 12, 1957

2,785,178

PREPARATION OF N-ACYLTRYPTOPHAN ESTERS

David Oliver Holland, Dorking, England, assignor to Beecham Research Laboratories Limited, Betchworth, Surrey, England, a company of Great Britain No Drawing. Application December 19, 1952,
Serial No. 327,039

Claims priority, application Great Britain
December 21, 1951

5 Claims. (Cl. 260—319)

This invention is an improved process for the preparation of N-acyltryptophan esters, e. g. N-acetyl trytophan ethyl ester, which are useful as intermediates in the preparation of tryptophan which is of known therapeutical value.

According to the present invention, these intermediates are prepared by treating an ester of α-acyl-β-(3-indolyl)-propionic acid with hydrazoic acid and, preferably concentrated, sulphuric acid. The ester starting material is preferably a lower alkyl ester and its acyl group is preferably a lower fatty acid acyl group, e. g. ethyl α-aceto-β-(3-indolyl) propionate.

It is surprising that useful yields of N-acyltryptophan esters are obtained, since it might be expected that the indole ring would be unstable in the reaction employed.

As a second feature of the present invention, tryptophan is prepared by hydrolysis of an N-acyltryptophan ester, preferably by utilising an alkaline hydrolysing agent.

The invention is illustrated in the following examples:

*Example 1*

To a solution of ethyl α-aceto-β-(3-indolyl)-propionate (7.25 g.) in chloroform (30 ml.) there was added a solution of hydrazoic acid in chloroform (24.9 ml. of 4.83% w./v. solution) and the mixture was added dropwise to a vigorously stirred mixture of concentrated sulphuric acid (20 ml.) and chloroform (20 ml.) over 40 minutes while maintaining the mixture at −3 to 0°. After the addition the mixture was stirred at the same temperature for a further 30 minutes and then diluted with crushed ice (about 200 g.). When the ice had melted, the chloroform layer was run off and the aqueous layer was extracted with two 50 ml. portions of chloroform. The combined chloroform solutions were washed with a little water, dried over anhydrous sodium sulphate and evaporated under reduced pressure to yield a gum.

This gum on rubbing with ether gave a cream coloured powder, M. P. 129–130° (4.79 g). On concentration, the mother liquors from this yielded a further 1.01 g. of the same product. Total yield, 75%. N-acetyl-tryptophan ethyl ester was obtained as colourless glistening plates, M. P. 131.5–132.5° on recrystallisation from 50% aqueous alcohol.

Hydrolysis of this compound was carried out by heating 1 g. under reflux with 10% aqueous sodium hydroxide (10 ml.) for 20 hours. The product, after cooling, was acidified with concentrated hydrochloric acid and evaporated under reduced pressure. The residual sticky solid was boiled up with alcohol (50 ml.), the solution filtered from inorganic contaminants and again concentrated under reduced pressure. The residue was heated on the steam-bath with water (10 ml.) and triethylamine (10 ml.) for 30 minutes, and the solution evaporated under reduced pressure. The residual pale brown solid on washing with alcohol gave rise to crude tryptophan as a white powder. It was purified by recrystallisation from acetic acid, after filtering off a little insoluble materiel from the hot solution. Yield 0.62 g. (83%).

*Example 2*

A mixture of a solution of methyl α-aceto-β-(3-indolyl)-propionate (6.24 g.) in chloroform (25 ml.) with a solution of hydrazoic acid in chloroform (21 ml. of 5.3% w./v. solution) was treated with concentrated sulphuric acid (20 ml.) and chloroform (20 ml.) as described in Example 1. After working up as described in Example 1 there was obtained a gum which on rubbing with ether gave a cream coloured powder M. P. 123–126° (4.71 g.). On recrystallisation N-acetyltryptophan methyl ester was obtained as colourless prisms M. P. 154°. This ester may be hydrolysed to tryptophan as described in Example 1.

The starting ester used in this example was prepared as follows:

To a solution of sodium (2.3 g.) in a dry ethyl alcohol (80 ml.) was added methyl acetoacetate (23.2 g.) and gramine (17.4 g.). To the solution thus obtained methyl sulphate (19.2 ml.) was run in over a period of 30 minutes with stirring and mild cooling to maintain a temperature of 10–20°. After stirring for four hours at room temperature the mixture was evaporated under reduced pressure and the residue treated with water (80 ml.) and chloroform (120 ml.). The layers were separated and the pale yellow chloroform layer washed with water and dried over sodium sulphate. On removing the chloroform, the required product was obtained as a red gum (17.26 g.).

By the same procedure as described in the aforesaid examples there may be readily obtained the corresponding N-benzoyltryptophan esters which can be hydrolysed to tryptophan.

I claim:

1. Process for the preparation of N-acyltryptophan esters by treating a lower alkyl ester of α-carboxylic-acyl-β-(3-indolyl)-propionic acid with hydrazoic acid and sulphuric acid.

2. Process for the preparation of N-acyltryptophan esters by treating a lower alkyl ester of a α-carboxylic-acyl-β-(3-indolyl)-propionic acid with hydrazoic acid and concentrated sulphuric acid.

3. Process for the preparation of N-acetyltryptophan esters by treating a lower alkyl ester of α-aceto-β-(3-indolyl)-propionic acid with hydrazoic acid and sulphuric acid.

4. Process for the preparation of N-acetyltryptophan esters by treating a lower alkyl ester of α-aceto-β-(3-indolyl)-propionic acid with hydrazoic acid and concentrated sulphuric acid.

5. Process for the preparation of N-benzoyl tryptophan esters by treating a lower alkyl ester of α-benzoyl-β-(3-indolyl)-propionic acid with hydrazoic acid and sulphuric acid.

References Cited in the file of this patent

Schmidt: Berichte der deusch. chem. Ges., vol. 57, pp. 704–6 (1924).

Dunn et al.: pp. 330–331 only of article on pp. 295–382, Advances in Protein Chemistry, vol. III (1947).

Journal Chem. Soc. (1953), pp. 280–5.